Sept. 27, 1932.   R. H. GODDARD   1,879,187
MECHANISM FOR DIRECTING FLIGHT
Filed Feb. 7, 1931   4 Sheets-Sheet 2

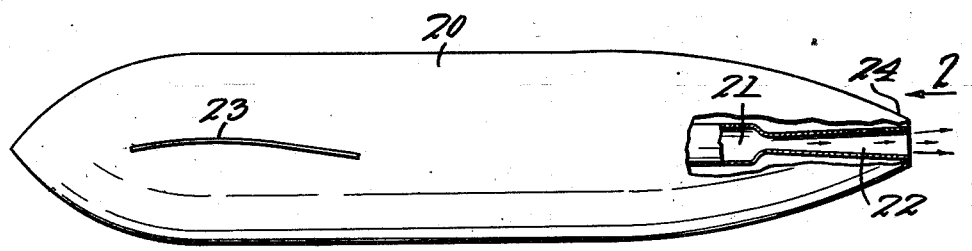
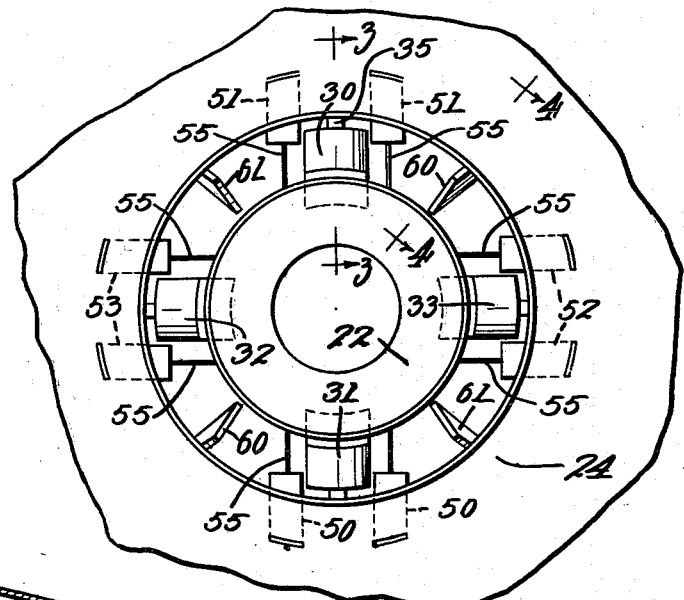
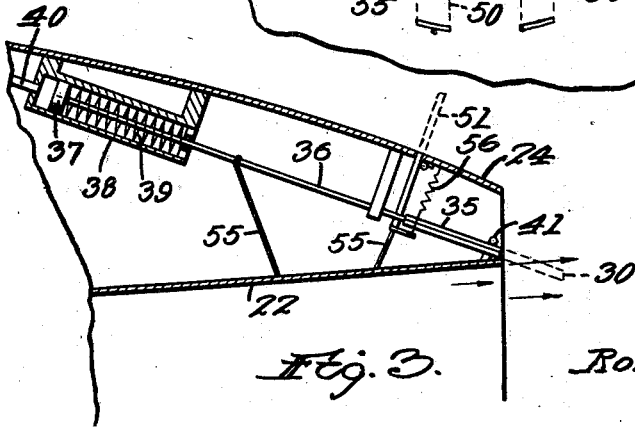

Inventor
Robert H. Goddard
By Attorneys

Sept. 27, 1932.  R. H. GODDARD  1,879,187
MECHANISM FOR DIRECTING FLIGHT
Filed Feb. 7, 1931  4 Sheets-Sheet 3

Inventor
Robert H. Goddard
By Attorneys

Sept. 27, 1932.   R. H. GODDARD   1,879,187
MECHANISM FOR DIRECTING FLIGHT
Filed Feb. 7, 1931   4 Sheets-Sheet 4
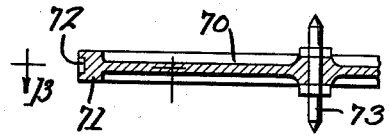
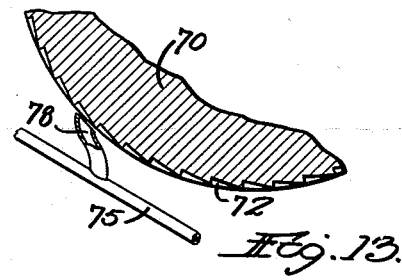
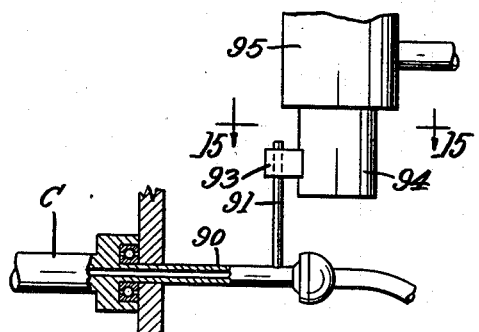
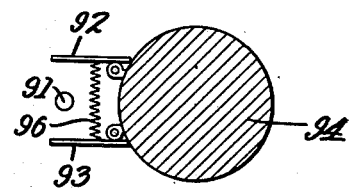
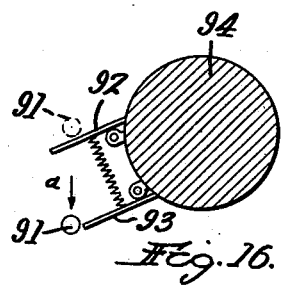
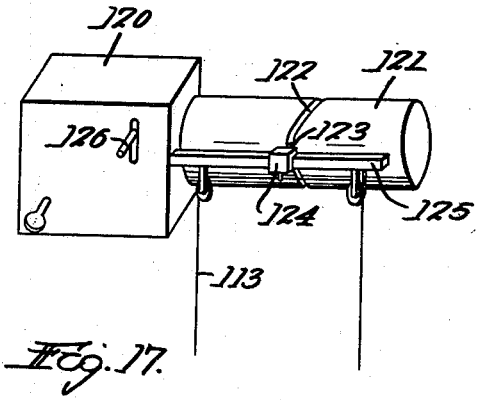

Patented Sept. 27, 1932

1,879,187

UNITED STATES PATENT OFFICE

ROBERT H. GODDARD, OF WORCESTER, MASSACHUSETTS

MECHANISM FOR DIRECTING FLIGHT

Application filed February 7, 1931. Serial No. 514,290.

This invention relates to air-craft and particularly to air-craft of the rocket type, or craft in which propulsion is effected by the discharge of combustion gases through a rearwardly directed nozzle or passage.

It is the general object of my invention to provide mechanism which will enable such an air-craft to preserve its direction of flight and its orientation without manual supervision or attention.

A further object is to provide directing apparatus which will be operative under very low air pressure conditions or in a substantial vacuum. In the preferred form, my directing mechanism is equally effective under widely varying conditions of atmospheric pressure.

More specifically, my invention relates to the provision of directing vanes, controlled in position by a plurality of gyroscopes, and adapted to be projected into the atmosphere surrounding the air-craft or into the path of the discharge gases.

The direction of flight is effected by the pressure of the discharge gases against the directing vanes when the craft is in a vacuum or low pressure area and by the combined action of the discharge gases and the atmosphere against a plurality of vanes when in an area of more dense atmosphere.

Further features of the invention relate to the provision for manual control of the direction of flight and orientation of the craft and also for automatically diverting the flight from a predetermined straight course.

I also provide means for manually resetting the gyroscopes if they are accidentally displaced from their normal planes of rotation.

My invention further relates to arrangements and combinations of parts which will be hereinafter described and more particularly pointed out in the appended claims.

A preferred form of the invention is shown in the drawings, in which

Fig. 1 is a side elevation of a type of air-craft adapted to receive my improved directing mechanism;

Fig. 2 is an enlarged rear elevation of a portion of the craft, looking in the direction of the arrow 2 in Fig. 1;

Figure 4:
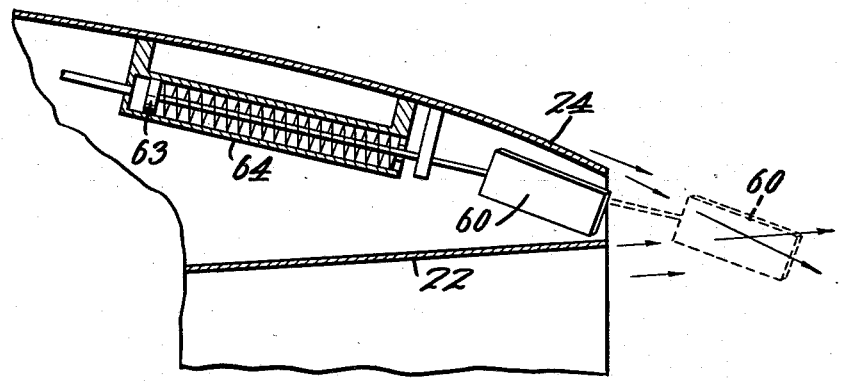
Figure 5:
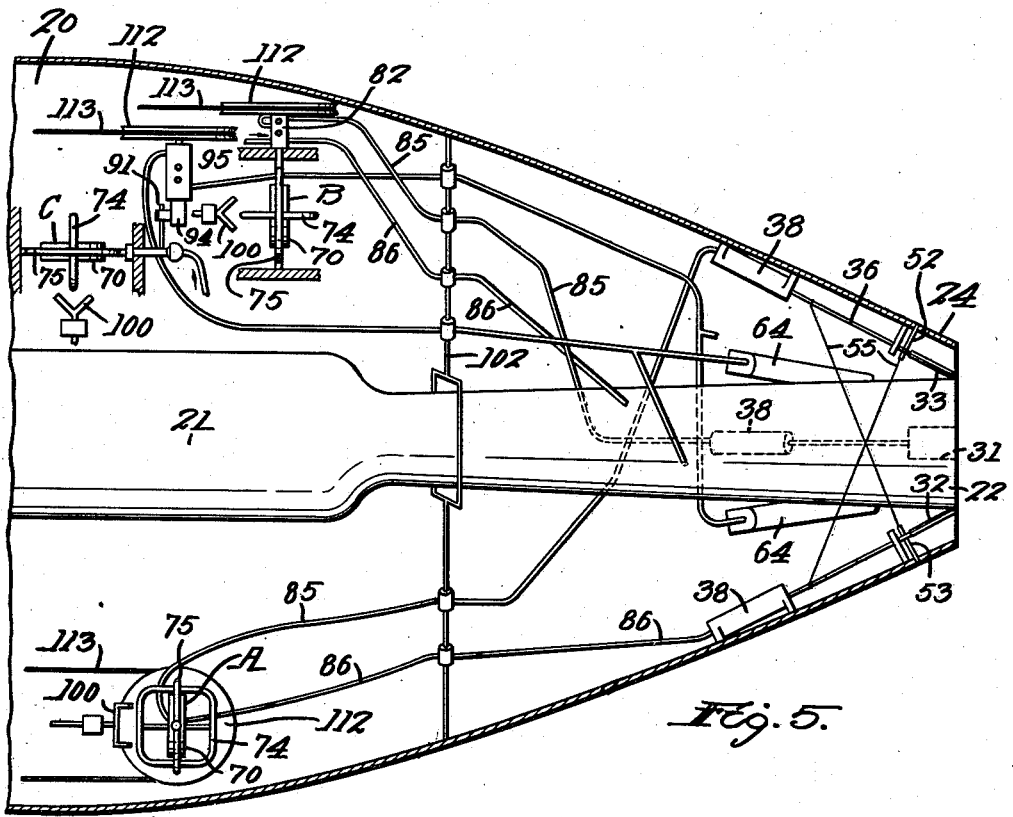
Figure 7:
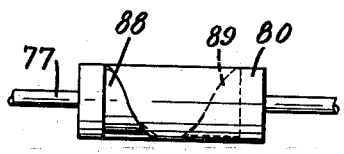
Figure 6:
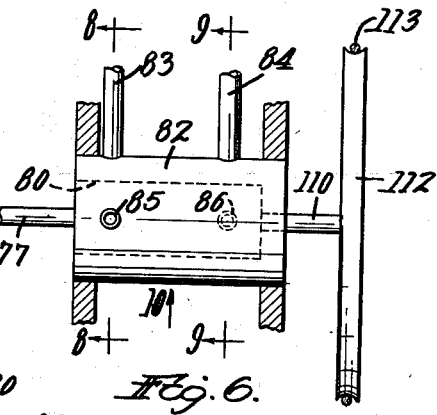
Figure 8:
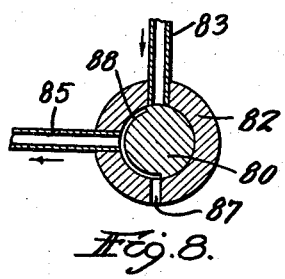
Figure 9:
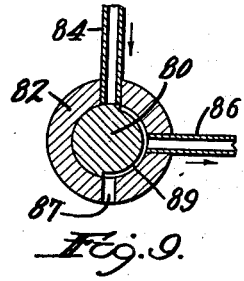
Figure 10:
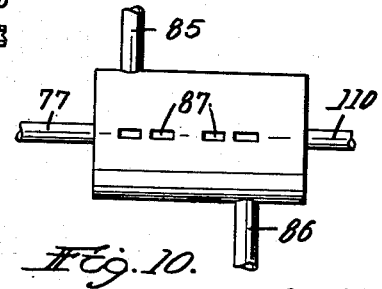
Figure 18:
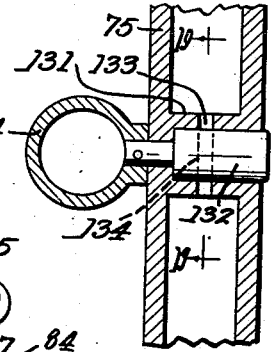
Figure 11:
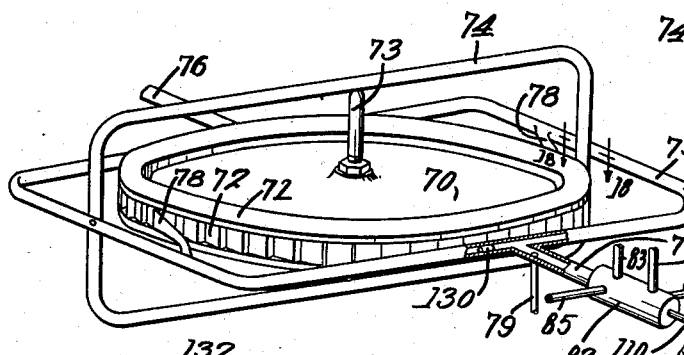
Figure 19:
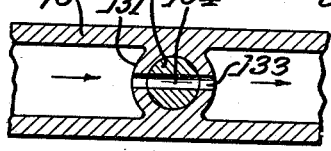

Figs. 3 and 4 are detail sectional elevations, taken along the lines 3—3 and 4—4 in Fig. 2;

Fig. 5 is a partial sectional plan view of the rear portion of an air-craft, with the directing mechanism embodied therein;

Fig. 6 is a side elevation of one of the gyroscope control valves;

Fig. 7 is a side elevation of the movable valve member;

Figs. 8 and 9 are sectional end elevations, taken along the lines 8—8 and 9—9 in Fig. 6;

Fig. 10 is a bottom view of the valve mechanism, looking in the direction of the arrow 10 in Fig. 6;

Fig. 11 is a perspective view of one of the gyroscopes;

Fig. 12 is a partial sectional elevation of the rotating member of the gyroscope;

Fig. 13 is a partial sectional plan view, taken along the line 13—13 in Fig. 12 and showing the means for rotating the gyroscope;

Fig. 14 is a detail view showing the operative connections between the orienting gyroscope and its valve mechanism;

Figs. 15 and 16 are detail sectional views, taken along the line 15—15 in Fig. 14 and showing the valve member in different positions;

Fig. 17 is a detail perspective view of certain automatic directing apparatus;

Fig. 18 is a detail sectional plan view, taken along the line 18—18 in Fig. 11; and Fig. 19 is a detail sectional elevation, taken along the line 19—19 in Fig. 18.

Referring to the drawings, I have indicated in Fig. 1 an air-ship 20 provided with a combustion chamber 21 and a rearwardly directed discharge nozzle 22. The air-ship may be provided with vanes or wings 23 for assisting in maintaining the direction of flight and may be provided with any suitable mechanism for intermittently supplying a fuel mixture or explosive charge to the combustion chamber 21.

The mechanism for supplying the mixture and igniting or exploding the same in the combustion chamber forms no part of my present invention, which is concerned with the provision of mechanism for maintaining the direction of flight and orientation of the craft 20.

The discharge nozzle 22 is indicated as terminating at the rear end of the air-craft 20 and somewhat closely adjacent to the contracted external surface 24 thereof.

When such a craft is operated under very low pressure conditions or in a substantial vacuum, it is obvious that outwardly projecting vanes or rudders will have very little directing effect, on account of the extreme thinness of the atmosphere encountered thereby. Consequently, I utilize the flow of combustion gases through the discharge nozzle 22 for directing and orienting the craft.

For correcting vertical or horizontal deviations of flight, I provide vertically movable vanes 30 and 31 and horizontally movable vanes 32 and 33. Each of these vanes is mounted on a square supporting shaft 35 (Fig. 3) and is connected by a piston rod 36 to a piston 37 in an operating cylinder 38. Each vane is normally maintained in withdrawn or inoperative position by a coil spring 39 in the cylinder 38.

When it is desired to correct the direction of flight, gas pressure from any suitable source is admitted through a pipe 40 to the upper end of the selected cylinder 38, forcing the corresponding piston 37 downward and projecting the corresponding vane 30 to 33 into the path of the exhaust gases in the nozzle 22. A roller 41 may be provided for reducing frictional resistance to movement of the vane, caused by the pressure of the exhaust gases as soon as the end of the vane is projected into the nozzle 22.

It will be obvious that movement of the upper vane 30 into the path of the exhaust gases will cause the rear end of the craft 20 to be displaced upwardly, correspondingly depressing the front end and causing a downward correction of the line of flight.

Correspondingly, projection of the lower vane 31 into the discharge nozzle 22 causes an upward correction. The horizontal vane 32 similarly causes a correction to the right and the vane 33 causes a correction to the left.

While the projection of the vanes into the path of the discharge gases is effective in correcting the flight, it also reduces the efficiency of the propulsion mechanism by interference with the flow of the gases. Accordingly, it is desirable to take advantage as far as possible of the external atmosphere for correcting flight, where the density of the atmosphere is sufficient to produce a directing effect.

Accordingly, I have provided additional vanes 50, 51, 52 and 53 operative in conjunction with the vanes 30 to 33 previously described. These vanes 50 to 53 are normally withdrawn within the outer shell 24 of the air-craft but are adapted to be projected outward, as indicated in dotted lines in Fig. 3. The vanes 50 to 53 are cross-connected by cords 55 with the vanes 30 to 33 and are each provided with tension springs 56 (Fig. 3) connected to move the vanes outward.

The connections are so made that when one of the inwardly movable directing vanes 30 to 33 is advanced into the discharge nozzle, the associated opposite pair of vanes 50 to 53 will be released for movement outward by the associated springs 56. For example, when the upper vane 30 is projected into the discharge nozzle, the two lower vanes 50 will be projected into the atmosphere.

It will be obvious that a vane projecting inward at one side of the discharge passage will tend to turn the craft in the same direction as a vane projecting outward at the opposite side of the air-craft. I am thus able to take advantage of the atmosphere, when present in sufficient density, and of the discharge gases under all atmospheric conditions.

In order to preserve the orientation of the craft or to keep the craft on an even keel, I provide additional directing vanes 60 and 61 (Fig. 2) spaced about the rear end of the discharge nozzle 23.

It will be noted that the vanes 60 and 61 are not radially disposed, but that the vanes 60 are angularly displaced in one direction and the vanes 61 in the opposite direction. These orienting vanes are normally withdrawn between the nozzle 22 and the outer surface 24, as indicated in Fig. 4, but are adapted to be projected to the dotted line position in Fig. 4 by pistons 63 in cylinders 64, similar in all respects to the mechanism for moving the vanes 30 to 33 previously described.

When one of the vanes 60 or 61 is projected rearward, it is so positioned that an inner portion of the vane is in the path of the exhaust gases, while an outer portion of the vane is in the path of the atmosphere flowing along the outer surface 24 of the air-craft, thus taking advantage of the atmosphere when present in sufficient density, as with the elevating and horizontally deflecting vanes previously described.

The cylinders 64 are connected to operate in pairs, so that the two vanes 60 will be simultaneously moved to operative position, or the two vanes 61. The vanes 60 cause an angular correction in one direction and the vanes 61 cause a similar correction in the opposite direction.

Gyroscope control

I have provided gyroscope mechanism for regulating the admission of gas under pressure to the various cylinders 38 and 64, and this mechanism will now be described.

For this purpose, I have provided a gyroscope mechanism A for control of the right and left vanes 32 and 33, a gyroscope mechanism B for control of the elevating vanes 30 and 31, and a gyroscope mechanism C for control of the orienting vanes 60 and 61. The gyroscope mechanisms A and B are substantially similar and a description of the mechanism A shown in Fig. 11 will apply equally to the mechanism B.

A rotating member or wheel 70 (Fig. 12) is provided with a relatively heavy rim 71 having pockets 72 (Fig. 13) formed in the periphery thereof. The wheel 70 is provided with a pivot stud 73 by which it is supported in an inner gimbal ring 74, which in turn is pivotally mounted in an outer gimbal ring 75, which is normally in the plane of rotation of the wheel 70.

The outer ring 75 is formed of hollow tubing having outwardly projecting bearing portions 76 and 77. Nozzles 78 (Figs. 11 and 13) are mounted on the outer gimbal 75 and are provided with outlet openings adjacent the periphery of the wheel 70 and substantially in alignment with the pivotal connections between the gimbal rings 74 and 75.

A flexible pipe 79 (Fig. 11) is connected to a suitable source of air or other gas under pressure, so that a flow of gas may be directed through the nozzles 78 into the pockets 72 and thus maintains the wheel 70 in rapid rotation. When thus rapidly rotated, the wheel 70 follows the usual laws of rotating bodies and resists displacement from its plane of rotation, which property is utilized in controlling my directing mechanism.

It is apparent that air or gas should be applied through the nozzles 78 only when the gimbal rings 74 and 75 are substantially perpendicular to each other, as otherwise the blast of air or gas would tend to turn the inner gimbal ring 75 out of its control plane.

Accordingly, I provide a plug 130 (Fig. 11) in the outer ring 75 at the left of the pivot bearing 77, and I provide a valve casing 131 (Figs. 18 and 19) fixed in the tubing of the outer ring 75. I also provide a valve plug 132 fixed to turn with the inner ring 74 and preferably forming a pivotal connection between said rings. The casing 131 and plug 132 have narrow slots or passages 133 and 134 which are aligned when the gimbal rings 74 and 75 are perpendicular to each other but which are out of alignment when either ring is displaced, thus permitting air or gas to flow to the nozzles 78 only when the rings are in substantially perpendicular planes.

*Valve Mechanism*

The gyroscopes control the movements of the various directing vanes by opening or closing connections through which pressure gases are admitted to the cylinders 38 or 64. For thus controlling the gases, special valve mechanism is provided which will now be described, referring particularly to Figs. 7 to 11.

A cylindrical inner valve member 80 (Fig. 7) is mounted on an extension of the outer gimbal ring bearing portion 77 and is freely rotatable within a normally fixed valve casing 82. Pipes 83 and 84 extend from the valve casing 82 to a suitable source of supply of compressed air or other gas. Pipes 85 and 86 extend from the valve casing 82 to the cylinders 38 (Fig. 5) which control the laterally deflecting vanes 32 and 33.

Exhaust ports 87 are also formed in the valve casing 82 opposite the supply pipes 83 and 84. The valve member 80 is provided with shallow recessed portions 88 and 89, which are relatively broad at their lower or exhaust ends and much reduced in width at their upper or admission ends. The normal position of the member 80 is indicated in Figs. 8 and 9, with the pipes 85 and 86 connected through the recesses 88 and 89 to the exhaust ports 87.

If the air-craft deviates in a horizontal plane in either direction, the casing 82 will turn with the air-craft, while the valve member 80 is maintained in its initial position by the action of the gyroscope. Such turning movement in one direction will connect the pipe 83 through the recess 88 to the pipe 85, at the same time disconnecting the recess from the exhaust, and will thus cause operation of the vane 33, which will correct the flight by a movement to the left. If the deviation is in the opposite direction, the pipe 84 will be connected through the recess 89 to the pipe 86 to cause actuation of the vane 32.

The substantially triangular shape of the shallow recesses 88 and 89 in the valve member 80 is adopted for the following reason:

When the craft deviates only slightly from its course, the restoring force exerted by the vane or vanes should be relatively small, but when a considerable deviation occurs, a large force should be exerted. For a slight deviation, the compressed gas will enter through the narrow opening provided by the upper restricted end of the recess 88 or 89. This small amount of gas will cause the associated cylinder and piston to operate slowly and the connected vane or vanes will be pushed rearward only a short distance before the deviation is corrected.

If a large deviation occurs, the valve member 80 will be given a larger turning movement and a wider portion of the recess 88 or 89 will provide a larger port opening and more rapid movement of the associated piston and vane or vanes, producing a more strongly effective restoring force.

If the vanes were pushed to full operative position for a slight deviation, the restoring force of the vanes would be so great that the craft would be returned abruptly to and beyond its normal position and would tend to oscillate back and forth across its true direction of course.

This adaptation of the restoring force to the amount of deviation is particularly desirable when vanes are used which extend both into the discharge gases and into the external atmosphere, as in this case the restoring force is very large if the vanes are moved to full operative position.

The gyroscope mechanism B for operating the elevating vanes 30 and 31 is of exactly the same construction and operates in exactly the same manner as the gyroscope A above described.

The gyroscope C for controlling the orienting vanes 60 and 61 is also of similar construction but a special connection is provided between the extension 90 (Fig. 14) of the gyroscope C and the valve mechanism controlled thereby.

This extension 90 is provided with an outwardly extending rod 91, normally positioned between two arms 92 and 93 (Fig. 15) which are pivotally mounted on the periphery of an extended portion of the inner valve member 94, which is angularly movable in the casing 95 of the mechanism which controls the orienting vanes. Rolling or spinning movement of the air-craft will cause displacement of the rod 91 toward the arm 92 or the arm 93.

These arms are mounted to resist outward swinging movement relative to the valve member 94 but are yieldable inwardly toward each other and are normally yieldingly separated by a compression spring 96.

Assuming that the rod 91 is relatively displaced in the direction of the arrow $a$ in Fig. 16, the rod will engage the arm 93, moving the valve member 94 to the position indicated in Fig. 16 and thus causing one pair of orienting vanes to be moved to operative position.

If the craft is spinning, the rod 91 may make one or more complete revolutions relative to the valve member 94 and by such continued movement will be brought to the dotted line position in Fig. 16 and into engagement with the outside of the arm 92. Upon such engagement, the arm 92 will yield inwardly, allowing the rod 91 to pass freely thereby.

As the craft is restored to normal orientation, however, the rod 91 will move relatively in the opposite direction, engaging the inside of the arm 92 and moving the valve member back to the position indicated in Fig. 15.

Resetting devices

It sometimes happens that a gyroscope will be displaced out of its normal plane of operation, particularly when the gyroscope wheel is at rest or running at low speed. For resetting the gyroscopes in their normal planes, I provide forked members 100 (Fig. 5), each of which may be manually moved forward to engage the inner gimbal ring 74 of one of the gyroscopes and to bring the same positively to a predetermined normal plane.

I also provide a valve rod 102 (Fig. 5) which may be moved axially to simultaneously shut off all of the control connections between the gyroscopes and the operating cylinders before advancing the forked members 100 to correct the positions of the gyroscopes.

The valve rod 102 may also be used for closing the connections whenever desired for any other purpose.

Manual control

The gyroscope mechanisms above described will control the air-craft and maintain its direction and orientation automatically for an extended flight, whether or not an operator is present. It is desirable, however, when an operator is at hand, that he should be able to deflect the craft from a predetermined straight course if desired and this may be accomplished by manually moving a selected valve casing 82 (Fig. 11) or 95 (Fig. 14) relative to the inner valve member 80 or 94.

For this purpose, the casings 82 and 95 are pivotally mounted and a short shaft 110 (Fig. 6) is secured in the end of each valve casing 82 or 95 and is provided with a grooved pulley 112 around which a cord or cable 113 extends. These cords 113 (Fig. 5) may be extended forward to any convenient position in the air-craft. By manual movement of the cords in one direction or the other, the corresponding valve casings may be turned relative to the inner valve members, thereby causing the corresponding vanes to be thrown into operation and causing a deflection of the ship from the normal straight path.

By throwing the orienting vanes into operation at the same time that the elevating or horizontal deflecting vanes are made operative, the ship may be caused to roll or bank as the direction of flight is fore or less abruptly altered.

Automatic deflection

I have also provided means by which the direction of flight may be changed automatically. For this purpose I have provided a clockwork 120 (Fig. 17) of any usual type by which a cylinder 121 may be slowly rotated. This cylinder is provided with a cam groove 122 which receives the end of a stud 123 carried by a slide 124 to which is connected one of the cords or cables 113.

The slide 124 is supported on a fixed guide-bar 125 and is movable along the guide-bar in accordance with the lay-out of the cam groove 122. The clockwork 120 may be placed in operation by movement of a release lever 126. When thus placed in operation, it is obvious that the cord 113 will be moved in one direction or the other in accordance with the shape of the cam groove 122, causing corresponding movement of the attached valve casing 82 or 95 and thereby altering the course of the ship.

It will be understood that three automatic mechanisms such as are shown in Fig. 17 will be required for complete control of the course, one for each gyroscope mechanism.

The pipes 83 to 86 connected with the valve casings are made flexible to a sufficient extent to permit manual or automatic movement of the casings for altering the course of flight as above described.

Having described the construction and operation of my improved flight directing mechanism, the advantages thereof will be readily apparent. The mechanism is effective for maintaining both the vertical and horizontal direction of flight and also the orientation, without dependence on the density of the atmosphere through which the air-craft is traveling. The mechanism is effective even in a substantially perfect vacuum, a result which to my knowledge has never before been attained. Furthermore, I have provided for manual or automatic changes in the course of flight, and the automatic changes will be made in accordance with a predetermined plan.

Having thus described my invention and the advantages thereof, I do not wish to be limited to the details herein disclosed, otherwise than as set forth in the claims, but what I claim is :—

1. Directing mechanism for an air-craft having a combustion chamber with a rearwardly directed gas discharge passage, comprising vanes mounted adjacent said passage, means to advance a selected vane into said passage, and automatic devices effective to render said means operative upon deviation of the craft from a predetermined orientation.

2. Directing mechanism for an air-craft having a gas discharge passage, comprising vanes mounted adjacent said passage, additional vanes mounted adjacent the outer surface of the air-craft, and means to project one vane into said gas passage and to simultaneously project a vane from the outer surface at the opposite side of the air-craft.

3. Directing mechanism for an air-craft having a gas discharge passage, comprising vanes mounted adjacent said passage, additional vanes mounted adjacent the outer surface of the air-craft, and means to project one vane into said gas passage and to simultaneously project a vane from the outer surface at the opposite side of the air-craft, all of said vanes being entirely withdrawn from said passage and within said outer surface when in normal inoperative position.

4. In an air-craft, having an elongated enclosed body and supporting wings, a set of orienting vanes mounted in said body and adapted to turn the craft in one direction about its longitudinal axis, a second set of orienting vanes correspondingly mounted and adapted to turn the craft in the opposite direction, and means to advance a selected set of vanes into a gaseous stream adjacent said body to correct a roll or spin of the craft in a given direction.

5. In an air-craft, having an elongated enclosed body and supporting wings, a set of orienting vanes mounted in said body and at a fixed inclination to the path of travel of the air-craft and adapted to turn the craft in one direction about its longitudinal axis, a second set of vanes correspondingly mounted and adapted to turn the craft in the opposite direction, and automatic means to render either set operative upon deviation of the craft from an even keel in a given direction.

6. The combination in directing apparatus as set forth in claim 5, in which the orienting vanes when in operative position have their outer portions projecting beyond the outer surface of said air-craft body.

7. The combination in directing apparatus as set forth in claim 5, in which the air-craft has a gas discharge passage and in which the orienting vanes when in operative position have inner portions projecting into said gas passage and outer portions projecting beyond the outer surface of said air-craft.

8. In an air-craft, vanes to correct lateral or vertical deviation, orienting vanes, a plurality of gyroscopes connected to control the normal operation of said vanes, and automatic means to control said vanes to effect a predetermined variation in flight direction or orientation.

9. In an air-craft having a rearwardly contracting outer surface, a gas discharge nozzle having its rear end adjacent the rear end of said outer surface but inwardly radially spaced therefrom, orienting vanes normally housed between said passage and said outer surface adjacent the rear end thereof, and means to move said vanes rearward to a position in which the inner portions of the vanes project into said passage and the outer portions project beyond said outer surface.

10. In an air-craft having a discharge passage, a series of orienting vanes equally spaced about the periphery of said passage, with alternate vanes oppositely inclined with respect to an axial plane of said air-craft, and means to project all of the similarly inclined vanes into said passage upon deviation in orientation in one direction and all of the oppositely inclined vanes upon deviation in the opposite direction.

11. Direction apparatus for an air-craft having a combustion chamber and a discharge nozzle, comprising a vane mounted adjacent said nozzle but normally withdrawn therefrom, means to project said vane into said nozzle, a gyroscope to control said projecting means, and means to rotate the gyroscope wheel.

12. The combination in direction apparatus as set forth in claim 11, in which the gyroscope wheel is provided with peripheral pockets, and in which means is provided for discharging a compressed gas into said pockets in the plane of the wheel and at such a tangential angle as to cause rapid rotation thereof.

13. The combination in direction apparatus as set forth in claim 11, in which the gyroscope wheel is provided with peripheral pockets, and in which means is provided for discharging a compressed gas into said pockets in the plane of the wheel and at such a tangential angle as to cause rapid rotation thereof, and in which means is provided to shut off the compressed gas when the gas-discharging means is displaced out of the plane of said wheel.

14. Directing mechanism for an air-craft having a gas discharge passage, comprising vanes mounted adjacent said passage, and means to advance a selected vane into said passage, and means to proportion the movement of the vane to the deviation of the craft from its course.

15. Directing mechanism for an air-craft comprising a vane, means to project said vane into a gaseous current moving within and axially rearward relative to said craft, and means to proportion the movement of the vane to the deviation of the craft from its course.

16. In an aircraft, a combustion chamber having a rearwardly directed gaseous discharge passage, and steering elements selectively projectable by straight line endwise movement into said passage and rendered effective by engagement by said gases.

17. In an aircraft, a directing vane, a cylinder and piston for advancing said vane to operative position, a gyroscope, valve mechanism positioned thereby and controlling the admission of a compressed gas to said cylinder, said valve mechanism comprising a valve casing and a valve member angularly movable therein, one of said parts being connected to said gyroscope and the other part being separately adjustable manually, and automatic means to adjust said second part.

18. In an air-craft, a body, a plurality of orienting vanes mounted on said body, certain of said vanes being angularly displaced from radial position in one direction and other vanes being angularly displaced in an opposite direction, and automatic control mechanism therefor by which selected vanes may be projected outward to operative position, said mechanism comprising a gyroscope wheel normally rotated in a plane parallel to the longitudinal axis of the air-craft and in a definite position in a cross section plane of said craft, and vane-moving mechanism controlled by the relative position of said gyroscope wheel in said cross section plane.

In testimony whereof I have hereunto affixed my signature,

ROBERT H. GODDARD.